(12) United States Patent
Sedlmeier et al.

(10) Patent No.: US 9,669,861 B2
(45) Date of Patent: Jun. 6, 2017

(54) STEERING COLUMN ADJUSTING DEVICE FOR VEHICLES, PREFERABLY FOR COMMERCIAL VEHICLES

(71) Applicant: Willi Elbe Gelenkwellen GmbH & Co. KG, Tamm (DE)

(72) Inventors: Ralf Sedlmeier, Pleidelsheim (DE); Jörg Hauhoff, Altdorf (DE); Olaf Beuermann, Kornwestheim (DE); Tomasz Spyra, Brackenheim (DE); Tobias Wittmann, Tamm (DE)

(73) Assignee: Willi Elbe Gelenkwellen GmbH & Co. KG, Tamm (DE)

( * ) Notice: Subject to any disclaimer, the term of this patent is extended or adjusted under 35 U.S.C. 154(b) by 12 days.

(21) Appl. No.: 14/830,879

(22) Filed: Aug. 20, 2015

(65) Prior Publication Data

US 2016/0297466 A1 Oct. 13, 2016

(30) Foreign Application Priority Data

Apr. 13, 2015 (DE) .................. 10 2015 004 867

(51) Int. Cl.
*B62D 1/187* (2006.01)
*B62D 1/184* (2006.01)
*B62D 1/183* (2006.01)

(52) U.S. Cl.
CPC ............. *B62D 1/187* (2013.01); *B62D 1/183* (2013.01); *B62D 1/184* (2013.01)

(58) Field of Classification Search
None
See application file for complete search history.

(56) References Cited

U.S. PATENT DOCUMENTS

| | | | | |
|---|---|---|---|---|
| 6,829,962 B2* | 12/2004 | Cartwright | ............. | B62D 1/184 280/775 |
| 8,726,757 B2* | 5/2014 | Barroso | ................. | B62D 1/183 74/493 |
| 9,150,242 B2* | 10/2015 | Kjellestrom | ........... | B62D 1/187 |
| 2002/0020245 A1* | 2/2002 | Gaukel | ................. | B62D 1/184 74/493 |

FOREIGN PATENT DOCUMENTS

DE 102005007907 A1 * 8/2006 ............. B62D 1/187

* cited by examiner

*Primary Examiner* — Faye M Fleming
(74) *Attorney, Agent, or Firm* — Gudrun E. Huckett

(57) ABSTRACT

The steering column adjusting device for vehicles, preferably commercial vehicles, has a basic unit, with respect to which an adjusting unit is adjustable. With the adjusting unit, a steering spindle can be adjusted. In its respective position, the adjusting unit can be clamped with respect to the basic unit with at least one clamping device. The clamping device is pivotably mounted on the adjusting unit.

14 Claims, 5 Drawing Sheets

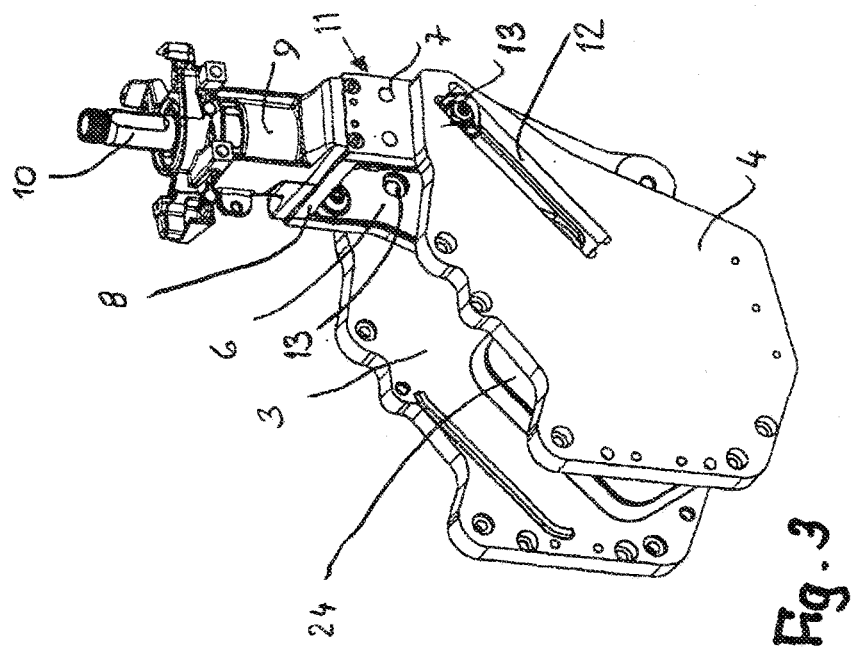
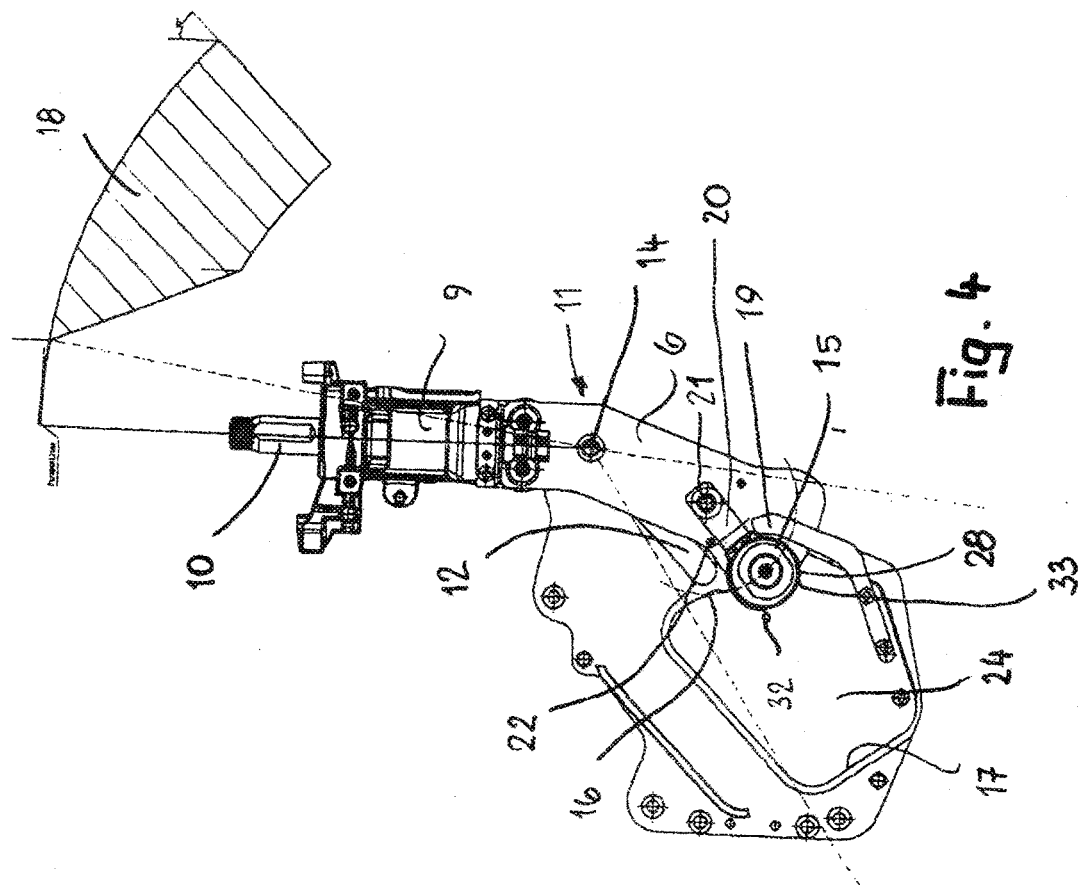

STEERING COLUMN ADJUSTING DEVICE FOR VEHICLES, PREFERABLY FOR COMMERCIAL VEHICLES

BACKGROUND OF THE INVENTION

The invention relates to a steering column adjusting device for vehicles, preferably for commercial vehicles, with a basic unit, with respect to which an adjusting unit is adjustable, with which a steering spindle is adjustable and which in its respective position is clampable with respect to the basic unit by means of at least one clamping device.

With such steering column adjusting devices, the steering column and thus the steering wheel can be adjusted within the vehicle in order to adapt it to the sitting position of the respective driver. The devices are designed so that the steering wheel cannot only be pivoted upwards and downwards but can also be adjusted in longitudinal direction of the steering column. The basic unit is held fixed in the vehicle. The adjusting unit receives the steering spindle and can be adjusted with respect to the basic unit fixed in the vehicle. In the respective position, the adjusting unit is clamped with respect to the basic unit fixed in the vehicle by means of a clamping device. In order to make possible large adjusting travels of the steering spindle and thus of the steering wheel, the device has relatively large dimensions. It is therefore difficult to provide such devices in particular where the installation space is only limited.

The invention is based on the object of forming the steering column adjusting device of the aforementioned kind so that large adjusting travels of the steering spindle and thus of the steering wheel are possible with compact design.

SUMMARY OF THE INVENTION

With the steering column adjusting device of the aforementioned kind, this object is solved according to the invention in that the clamping device is pivotably mounted on the adjusting unit.

The steering column adjusting device according to the invention is characterized in that the clamping device is pivotably mounted on the adjusting unit. Because of this it is possible to provide a large shifting travel for the adjusting unit and still ensure that the adjusting unit can be perfectly clamped with respect to the basic unit in any position.

In a preferred embodiment, the clamping device lies between two arms of the adjusting unit.

Simple fastening of the clamping device is achieved in that it is held on a support frame, which is pivotably mounted on the adjusting unit. With the support frame, the clamping device can be reliably pivoted with respect to the adjusting unit.

Preferably, the arms of the adjusting unit run parallel to one another and lie between two side parts of the basic unit. The arms of the adjusting unit are preferably connected to one another in a fixed manner so that secure synchronous movement of the arms of the adjusting unit is ensured.

The support frame is advantageously mounted on these two arms of the adjusting unit and lies between the two arms. In this manner, the support frame can be securely held on the adjusting unit with the clamping device. The two legs of the support frame advantageously form pivot levers, which are pivotably held on the arms of the adjusting unit. The clamping device is advantageously held on a web of the support frame connecting these legs.

In this context, it is advantageous when the clamping device is releasably connected to the support frame so that it can be simply replaced if required.

In an advantageous embodiment, at least one clamp is fastened on the support frame, which surrounds with clamping action the clamping device. The clamp can be very easily fastened to the support frame. The clamping device itself can be inserted into the clamp without problem.

The clamping device is advantageously a clamping cylinder, which can be simply held on the support frame, in particular in the clamp.

The clamping device advantageously interacts with at least one disc package provided on the basic unit. The discs of this disc package are pressed against one another by the clamping unit so that the adjusting unit in its respective position can be perfectly clamped with respect to the basic unit fixed to the vehicle.

In order to ensure secure clamping of the adjusting unit, a disc package each is provided in a preferred embodiment on the insides facing one another of the side parts of the basic unit fixed to the vehicle.

The adjusting unit is advantageously shiftable along the basic unit in order to adjust the adjusting unit and thus the steering wheel in different positions.

Simple shifting of the adjusting unit with respect to the basic unit is ensured in a preferred embodiment in that the side parts of the basic unit are each provided with a slot, in each of which at least one guide element of the adjusting unit is shiftable. The guide elements located in the slots ensure that the adjusting unit can be reliably shifted.

Advantageously, the adjusting unit is additionally pivotable about an axis located transversely to the shifting direction. Because of this, the steering wheel cannot only be adjusted at a different distance from the driver but also in different angular positions.

In an advantageous embodiment, the pivot axis of the adjusting unit is formed by the axis of the guide elements.

Reliable clamping of the adjusting unit with respect to the basic unit is achieved when the pivot axis of the clamping device runs parallel to the pivot axis of the adjusting unit.

In order to ensure secure clamping with respect to the basic unit in any position of the adjusting unit, the pivot travel of the clamping device in a preferred embodiment is limited by stops. Because of this it is achieved that the clamping device can always assume such a position that secure clamping of the adjusting unit with respect to the basic unit can be ensured.

In an advantageous embodiment, the stops stand away from the inside of the arms of the adjusting unit.

Since the clamping device respectively the support frame are freely pivotable about the pivot axis, the one stop of the adjusting unit ensures that the clamping device respectively the support frame can only be pivoted in a certain relevant position to the adjusting unit.

When the steering wheel to be adjusted into a parking position, in which entering the vehicle is facilitated for the driver, the adjusting unit is adjusted as far as possible with respect to the basic unit. Here, the clamping device reaches a further stop which is provided on at least one side part of the basic unit. This further stop ensures that the clamping device and the support frame during the shifting and pivoting of the adjusting unit into the parking position, the clamping device is pivoted against the relevant stop of the adjusting unit. In this way, the adjusting unit in the parking position is perfectly positioned with respect to the basic unit. The clamping device can then securely clamp the adjusting unit with respect to the basic unit.

The subject matter of the application is not only apparent from the subject matter of the individual patent claims, but also from all details and features disclosed in the drawings and the description. Even if these are not subject of the claims, they are claimed as being substantial to the invention provided they are new with respect to the prior art individually or combined.

Further features of the invention are obtained from the further claims, the description and the drawings.

BRIEF DESCRIPTION OF THE DRAWINGS

The invention is explained in more detail with the help of an exemplary embodiment shown in the drawings. It is shown in FIG. 1 a view of a half of a steering column adjusting device according to the invention, FIG. 2 a view in the direction of the arrow II in FIG. 1, FIG. 3 in a perspective representation the steering column adjusting device according to the invention in a parking position, FIG. 4 in a representation corresponding to FIG. 1 the steering column adjusting device in the parking position, FIG. 5 in a perspective representation the steering column adjusting device according to the invention in an operating position, FIG. 6 the steering column adjusting device according to FIG. 5 in front view, FIG. 7 the steering column adjusting device according to the invention with steering wheel and steering spindle in perspective representation, FIG. 8 the steering column adjusting device according to FIG. 7 in a side view.

DESCRIPTION OF PREFERRED EMBODIMENTS

With the steering column adjusting device, the steering wheel 34 (FIGS. 7 and 8) is adjusted into different positions within a vehicle, in particular a commercial vehicle, in order to adjust it to the respective driver. With the steering column adjusting device, the steering wheel can be additionally adjusted into a parking position, in which the steering wheel 34 is adjusted so that the driver can comfortably enter or exit the vehicle.

Figure 1:
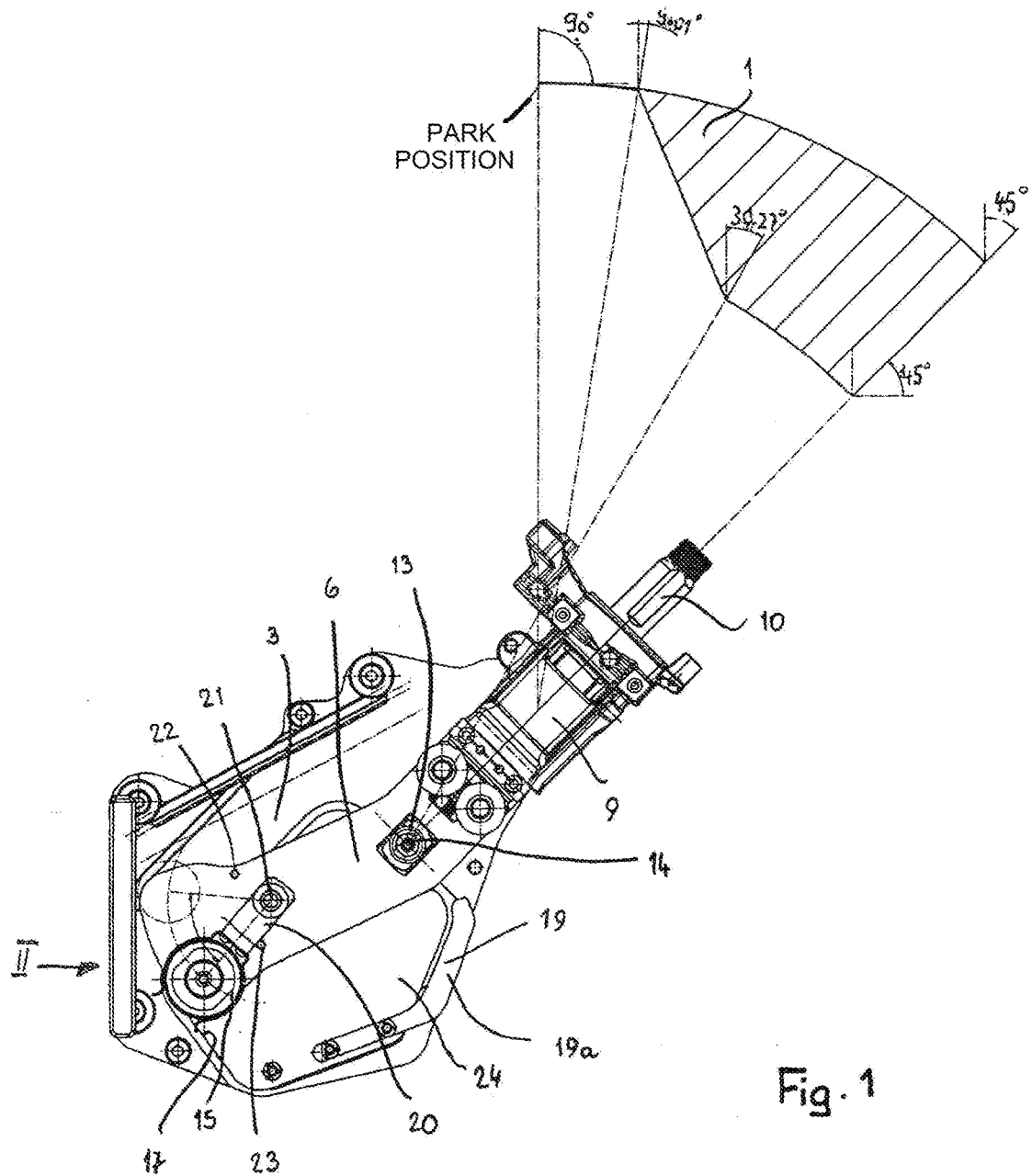

In FIG. 1, an adjusting field 1 is exemplarily shown, which indicates the possible adjusting range of the steering wheel 34 respectively the steering column. The adjusting field 1 can be adapted to the respective space conditions in the vehicle through the configuration of guideways and control cams.

Figure 7:
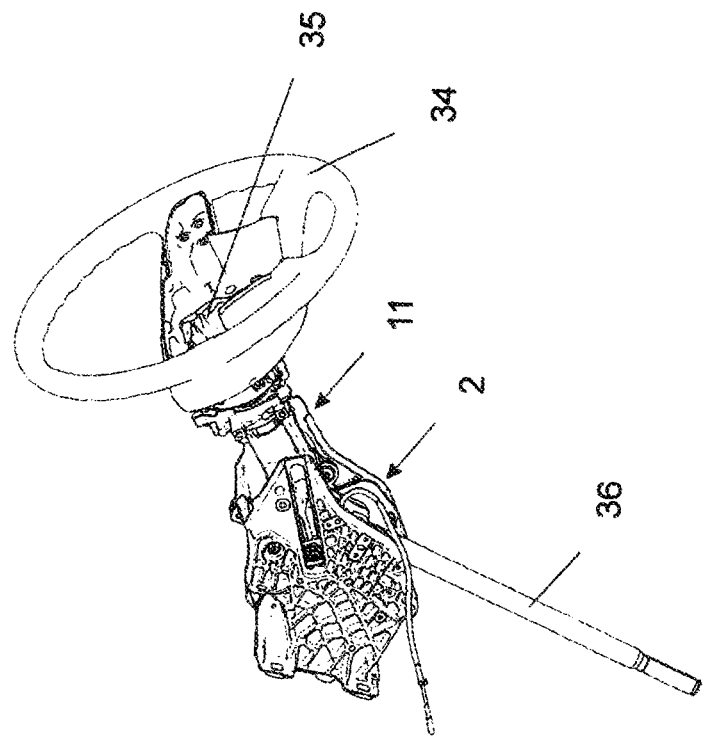
Figure 8:
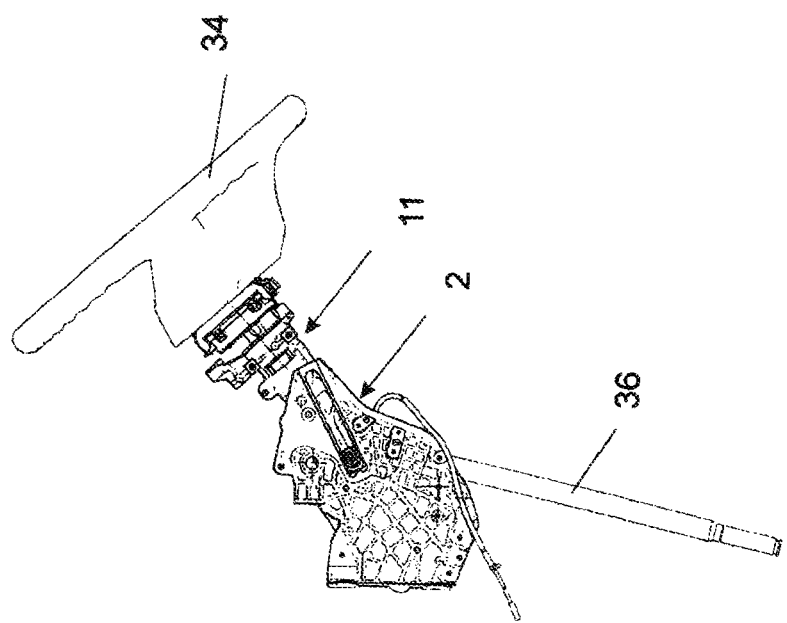

The steering column adjusting device has a basic unit 2, which comprises two plate-shaped outer parts 3, 4 which are parallel to one another. Between these is located clamping device 15, which comprises a clamping cylinder and serves for holding the steering column of the vehicle in the respectively adjusted position. The outer parts 3, 4 are installed fixed in the vehicle. Arms 6, 7, which run parallel to one another and at their end protruding over the outer parts 3, 4, are connected to one another by a cross plate 8 (FIG. 3), project into the region between the two outer parts 2, 3. On said cross plate 8 a jacket tube 9 is seated, through which a spindle connection 10 projects. It protrudes over the jacket tube 9 upwards and downwards and serves for connecting the respective steering spindle 35, 36 (FIGS. 7 and 8). The steering spindles 35, 36 are connected to the steering column adjusting device in the known manner. The steering spindle 36 is connected to the spindle connection 10 via a universal joint (not shown).

The two arms 6, 7 with the cross plate form an adjusting unit 11 with which the steering column can be adjusted into the different positions.

At least the one outer part, however preferably both outer parts 3, 4 each comprise a slot 12, which form the guideways for the arms 6, 7 of the adjusting unit 11. On their outsides facing from one another, the arms 6, 7 are each provided with a guide element 13, which engages in the slot 12.

The two slots 12 in the outer parts 3, 4 are designed identical and arranged parallel to one another. The adjusting unit 11 can be adjusted along the outer parts 3, 4, wherein the guide elements 13 are shifted in the slots 12. The maximum shifting travel of the adjusting unit 11 is determined by the length of the slots 12, against the ends of which the guide elements 13 come to lie in the respective end position. The adjusting unit 11 and thus the steering column can be shifted in their longitudinal direction in this manner in order to adjust the steering wheel 34 to the required distance from the driver.

The two guide elements 13 are axially aligned to one another and form a pivot axis 14, about which the adjusting unit 11 can be pivoted, it can thus be additionally pivoted about the axis 14 in any shifted position. In this way, the steering wheel 34 can be adjusted by the driver into any desired position so that he can comfortably operate the steering wheel 34.

The two arms 6, 7 are provided with the clamping device 15, which is advantageously formed as clamping cylinder. The clamping device 15 is provided in the region of the free ends of the arms 6, 7 and slightly protrudes if at all over the arms (FIGS. 1 and 4). The clamping device 15 is assigned two disc packages 24, 25, which are provided on the insides of the outer parts 3, 4 facing one another.

Figure 5:
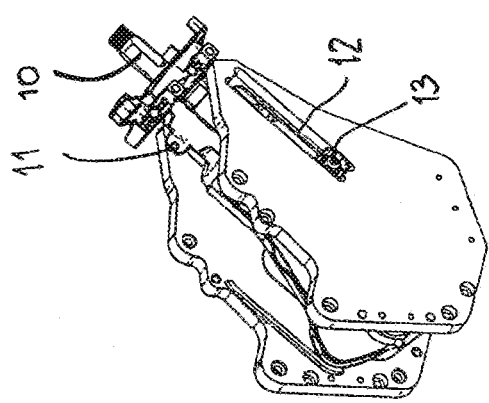
Figure 6:
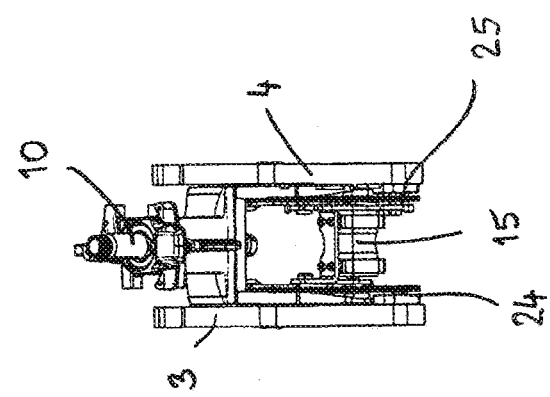

In FIGS. 1, 5 and 6, an operating position of the spindle connection 10 and thus of the steering column is exemplarily shown. With the adjusting unit 11, the steering wheel 34 can be adjusted over a very large adjusting range into the respective optimal position. In the shown exemplary embodiment, the adjusting field 1 extends over an angular range of approximately 35°. Within this angular range, the steering wheel 34 can be adjusted into any desired operating position. In the parking position, the steering wheel 34 is pivoted upwards the furthest so that the driver can comfortably enter or exit the vehicle.

With different outline forms of the adjusting field 1, very diverse positions of the steering wheel 34 can be determined in the interior of the vehicle. Through the shape of control cams and control fields, the adjusting possibilities of the steering wheels 34 can be precisely adjusted dependent on the respective vehicle.

The clamping device 15 is provided on the free end of one-armed levers 20 which with one end are pivotably mounted about an axis 21 on the arm 6, 7. The pivot travel of the levers 20 is limited by two stops 22, 23, which in the exemplary embodiment case have an angular distance of approximately 50°. FIGS. 3 and 4 show the steering spindle 35 in the parking position. The adjusting unit 11 is shifted so far that the guide elements 13 lie at the upper end of the slot 12 (FIG. 3). At the same time, the adjusting unit 11 is pivoted into a vertical position, in which the levers 20 lie against the stop 22 and against the stop 19 (FIG. 4). In the other extreme position (FIG. 1), the lever 20 lies against the other stop 23.

Here, the adjusting unit 11 is shifted downwards so far that the guide elements 13 are located at the lower end of the slots 12.

In any position, the adjusting unit 11 can be clamped by means of the clamping device 15. It is located between the two disc packages 24, 25 (FIG. 2), the discs of which can be clamped against one another in a fixed manner by means of the clamping device 15. The disc packages 24, 25 are arranged so that the clamping device 15 can clamp the disc packages 24, 25 in any adjusting position of the steering column respectively the steering wheel. Since the clamping device 15 is pivotably connected to the arms 6, 7 of the adjusting unit 11 via the levers 20, reliable clamping of the steering column can be ensured with the clamping device 15 in any adjusted position of the steering column respectively the steering wheel.

Figure 2:
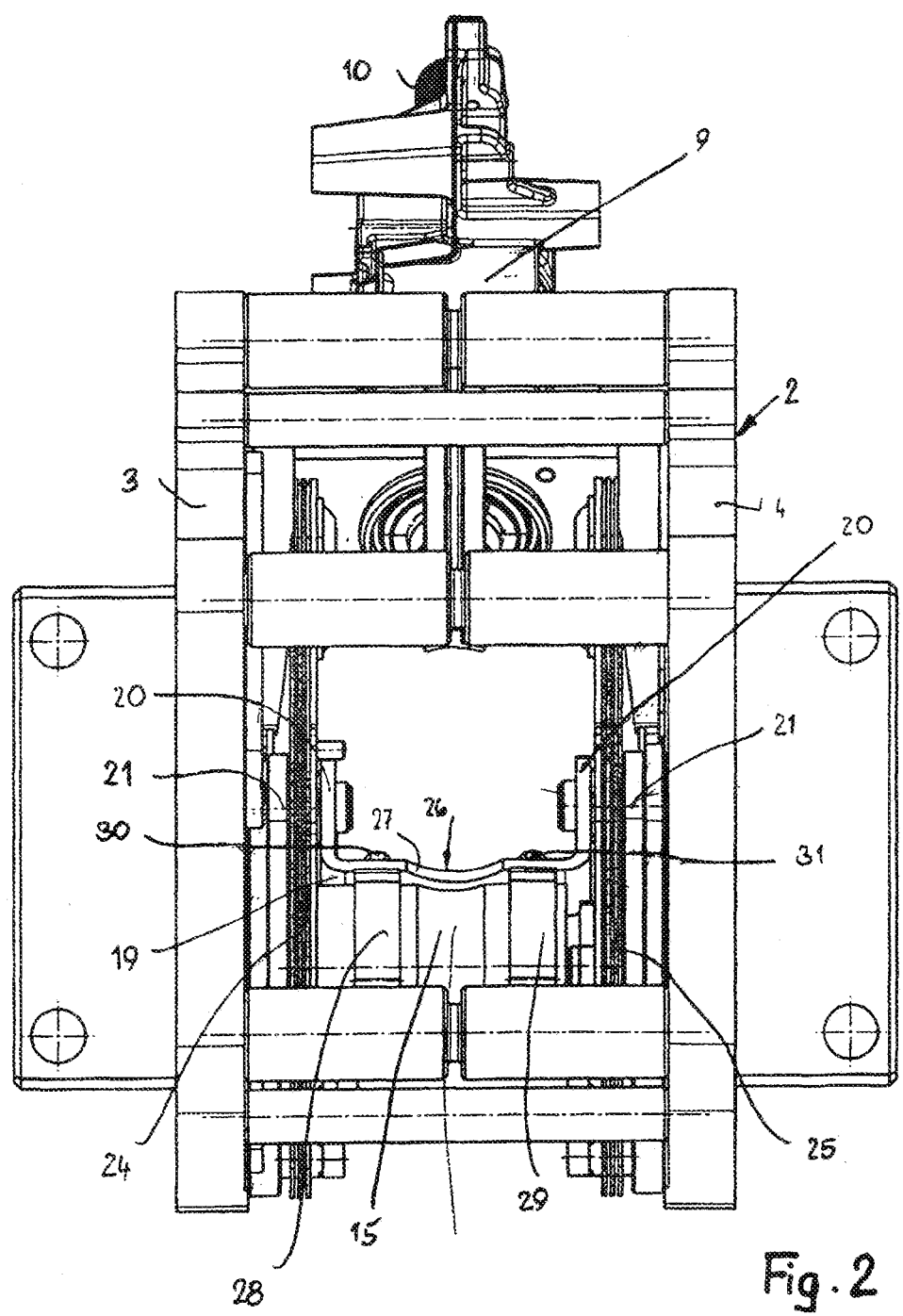

The levers 20 are part of a support frame 26, on which the clamping unit 15 is preferentially releasably fastened (FIG. 2). Advantageously, the clamping device 15 is held by two clamps 28, 29, which are fastened with screws 30, 31 on the web 27 of the support frame 26. The clamps 28, 29 lie spaced from one another and surround the clamping device 15 over the greatest part of its circumference (FIG. 4). The clamps 28, 29 make possible simple yet secure fastening of the clamping device 15 on the adjusting unit 11. The two free ends 32, 33 (FIG. 4) of the clamps 28, 29 are bent outwardly so that the clamping device 15 can be simply inserted into the clamps 28, 29.

FIGS. 1, 5 and 6 show the adjusting unit 11 in their one end position. The adjusting unit 11 is shifted so far that the guide elements 13 lie near the lower end of the slots 12. The clamping device 15 in this case lies near the edge 17 of the disc packages 24, 25 facing away from the jacket tube 9. Here, the clamping device 15 is pivoted so that the levers 20 lie against the stop 23 of the arms 6, 7 that is adjacent to the stop 19 (FIG. 1). In this position, the clamping device 15 protrudes only slightly over the edge 17 of the disc packages 24, 25. Because of the pivoted position, clamping of the discs of the disc packages 24, 25 takes place approximately at half the width of the disc packages 24, 25. Because of this, secure clamping of the adjusting unit 11 in this operating position is ensured.

Following release of the clamping, the adjusting unit 11 with the guide elements 13 can be continuously shifted along the slots 12 into the upper end position, in which the guide elements 13 are located near adjacent to the upper end of the slots 12 (FIG. 3). In this upper end position, the steering spindle 35 respectively the steering wheel 34 can be adjusted into the parking position, into which the steering wheel 34 assumes such a position that the driver can comfortably enter or exit the vehicle. In this position, the adjusting unit 11 is pivoted about the axis 14 in anti-clockwise direction (with respect to FIG. 4). Because of this, the clamping device 15 reaches the region of the stop 19 which is stationary with respect to the outer parts 3, 4. It is advantageously releasably fastened on the respective outer part 3, 4 and designed v-shaped. The stop 19 is arranged at the edge of the disc package 24, 25 so that the clamping device 15 during the adjusting of the steering spindle 35 into the parking position strikes the stop 19 and is adjusted relatively to the arms 6, 7 by the sloping leg 19a. In the process, the levers 20 pivot about the axis 21 until they lie against the stops 22 (FIG. 4). Thus, the levers 20 respectively the support frame 26 are pivoted about the axis 21 relative to the arms 6, 7. In the end position according to FIG. 4, the clamping device 15 lies against the stop 19. Apart from this, the levers 20 lie against the other stop 22. The two stops 19, 20 are provided so that the clamping device 15 in turn is located approximately at half the width of the disc packages 24, 25 so that their discs can be firmly pressed together. The clamping device 15 is additionally located near the edge 16 of the two disc packages 24, 25 located opposite the edge 17.

Following the release of the clamping, the guide elements 13 of the adjusting unit 11 can be continuously shifted in the slots 12 into any position and at the same time, when required, be pivoted about the axis 14 of the guide elements 13. In any position of the adjusting unit 11, the clamping device 15 is located in the region of the disc packages 24, 25 so that the adjusting unit 11 can be securely clamped in any operating position. As soon as the clamping device 15 clears the stop 19, the levers 20 respectively the support frame 26 pivot back under their own weight about the axis 21 so far that the levers 20 lie against the stop 23 (FIG. 1).

The steering column adjusting device is characterized by a highly compact design, wherein at the same time a large adjusting range for the adjusting unit 11 and thus for the steering wheel 34 is provided. The steering column adjusting device is therefore excellently suited for installation in constrained space conditions without the adjusting possibilities of the steering wheel 34 being impaired.

This application incorporates by reference the entire disclosure of the German priority application 10 2015 004 867.8 filed on Apr. 13, 2015.

What is claimed is:

1. A steering column adjusting device for vehicles, comprising:
   a basic unit;
   an adjusting unit configured to be adjustable relative to the basic unit;
   a steering spindle connected to the adjusting unit and adjustable by the adjusting unit;
   at least one clamping device pivotably mounted on the adjusting unit so as to pivot about a pivot axis and configured to clamp the steering spindle in a selected position relative to the basic unit;
   wherein the adjusting unit comprises two arms and the at least one clamping device is arranged between the two arms;
   wherein the basic unit comprises two spaced-apart side parts and wherein the two arms extend parallel to each other and are arranged between the two side parts;
   two disc packages arranged opposite each other on opposed facing inner sides of the side parts of the basic unit, wherein the at least one clamping device interacts with the two disc packages.

2. A steering column adjusting device for vehicles, comprising:
   a basic unit;
   an adjusting unit configured to be adjustable relative to the basic unit;
   a steering spindle connected to the adjusting unit and adjustable by the adjusting unit;
   at least one clamping device pivotably mounted on the adjusting unit so as to pivot about a pivot axis and configured to clamp the steering spindle in a selected position relative to the basic unit;
   wherein the adjusting unit comprises two arms and the at least one clamping device is arranged between the two arms;
   wherein the basic unit comprises two spaced-apart side parts and wherein the two arms extend parallel to each other and are arranged between the two side parts;

wherein the adjusting unit is shiftable along the basic unit into a park position and wherein on at least one of the two side parts a stop is provided and is arranged in a movement path of the at least one clamping device during shifting of the adjusting unit into the park position.

3. A steering column adjusting device for vehicles, comprising:
a basic unit;
an adjusting unit configured to be adjustable relative to the basic unit;
a steering spindle connected to the adjusting unit and adjustable by the adjusting unit;
at least one clamping device pivotably mounted on the adjusting unit so as to pivot about a pivot axis and configured to clamp the steering spindle in a selected position relative to the basic unit;
wherein the adjusting unit comprises two arms and the at least one clamping device is arranged between the two arms;
stops that limit a pivot travel of the clamping device.

4. The device according to claim 3, wherein the stops project from an inwardly facing side of the two arms of the adjusting unit.

5. A steering column adjusting device for vehicles, comprising:
a basic unit;
an adjusting unit configured to be adjustable relative to the basic unit;
a steering spindle connected to the adjusting unit and adjustable by the adjusting unit;
at least one clamping device pivotably mounted on the adjusting unit so as to pivot about a pivot axis and configured to clamp the steering spindle in a selected position relative to the basic unit;
a support frame pivotably mounted on the adjusting unit, wherein the at least one clamping device is mounted on the support frame.

6. The device according to claim 5, wherein the adjusting unit comprises two arms and the at least one clamping device is arranged between the two arms.

7. The device according to claim 6, wherein the basic unit comprises two spaced-apart side parts and wherein the two arms extend parallel to each other and are arranged between the two side parts.

8. The device according to claim 7, further comprising two disc packages arranged opposite each other on opposed facing inner sides of the side parts of the basic unit, wherein the at least one clamping device interacts with the two disc packages.

9. The device according to claim 7, wherein the adjusting unit is shiftable along the basic unit in a shifting direction.

10. The device according to claim 9, wherein the side parts each comprise a slot and wherein the adjusting unit comprises guide elements engaging the slots and guiding the adjusting unit when shifted along the basic unit in the shifting direction.

11. The device according to claim 10, wherein the adjusting unit is configured to pivot about a pivot axis extending transversely to the shifting direction.

12. The device according to claim 11, wherein the pivot axis is formed by the guide elements.

13. The device according to claim 11, wherein the pivot axis of the at least one clamping device is parallel to the pivot axis of the adjusting unit.

14. A steering column adjusting device for vehicles, comprising:
a basic unit;
an adjusting unit configured to be adjustable relative to the basic unit;
a steering spindle connected to the adjusting unit and adjustable by the adjusting unit;
at least one clamping device pivotably mounted on the adjusting unit so as to pivot about a pivot axis and configured to clamp the steering spindle in a selected position relative to the basic unit;
at least one disc package arranged on the basic unit, wherein the at least one clamping device interacts with the at least one disc package.

* * * * *